US007760308B2

(12) United States Patent
Park et al.

(10) Patent No.: US 7,760,308 B2
(45) Date of Patent: Jul. 20, 2010

(54) IN-PLANE SWITCHING MODE LIQUID CRYSTAL DISPLAY AND FABRICATING METHOD THEREOF

(75) Inventors: Ki-Bok Park, Gyeongsangbuk-do (KR); Sang-Ho Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 689 days.

(21) Appl. No.: 11/011,772

(22) Filed: Dec. 15, 2004

(65) Prior Publication Data
US 2005/0151910 A1 Jul. 14, 2005

(30) Foreign Application Priority Data
Dec. 15, 2003 (KR) .................. 10-2003-0091162

(51) Int. Cl.
*G02F 1/1343* (2006.01)
(52) U.S. Cl. .................. 349/141; 349/142; 349/143; 349/144
(58) Field of Classification Search .................. 349/114, 349/141–144
See application file for complete search history.

(56) References Cited

U.S. PATENT DOCUMENTS

| 6,088,078 | A | 7/2000 | Kim et al. |
| 6,452,657 | B1 | 9/2002 | Suzuki et al. |
| 6,570,638 | B2 * | 5/2003 | Song .................. 349/143 |
| 6,618,109 | B2 * | 9/2003 | Hidehira et al. .............. 349/141 |
| 6,697,141 | B2 * | 2/2004 | Yamakita et al. ............ 349/141 |
| 6,747,722 | B2 * | 6/2004 | Ono et al. .................. 349/141 |
| 7,006,188 | B2 * | 2/2006 | Lee et al. .................. 349/141 |
| 2002/0113935 | A1 * | 8/2002 | Yanagawa et al. ........... 349/155 |
| 2004/0252268 | A1 | 12/2004 | Lee et al. |
| 2008/0259265 | A1 * | 10/2008 | Ono et al. .................. 349/147 |

FOREIGN PATENT DOCUMENTS

| JP | 11-125835 | 11/1999 |
| KR | 1999-47252 | 7/1999 |

OTHER PUBLICATIONS

Communication from Korean Patent Office.

* cited by examiner

*Primary Examiner*—Hoan C Nguyen
(74) *Attorney, Agent, or Firm*—McKenna Long & Aldridge LLP (57) ABSTRACT

A liquid crystal display includes a pixel electrode connected with a thin film transistor and including at least one first pixel electrode portion and at least one second pixel electrode portion, a first angle between the first pixel electrode portion and the second pixel electrode portion being greater than 90 degrees, and a common electrode including at least one first common electrode portion and at least one second common electrode portion, a second angle between the first common electrode portion and the second common electrode portion is greater than 90 degrees, wherein the at least one first and second pixel electrode portions, and the at least one first and second common electrode portions define at least one domain.

16 Claims, 12 Drawing Sheets

IN-PLANE SWITCHING MODE LIQUID CRYSTAL DISPLAY AND FABRICATING METHOD THEREOF

The present invention claims the benefit of Korean Patent Application No. 2003-91162 filed in Korea on Dec. 15, 2003, which is hereby incorporated by reference.

BACKGROUND OF THE INVENTION

1. Field of the Invention

The present invention relates to a liquid crystal display, and more particularly, to an in-plane switching mode liquid crystal display and a fabricating method thereof.

2. Discussion of the Related Art

Cathode-ray tubes have generally been used until recently as display devices. Currently, efforts are being made to study and develop various types of flat panel displays, such as liquid crystal displays (LCD), plasma display panels (PDP), field emission displays (FED), and electro-luminescence displays (ELD), as alternatives to CRTs. Particularly, the interest in LCD is high because it is light, thin, compact, consumes less power, and displays high resolution images.

A vertical alignment mode (VA) has generally been used for fabricating an LCD. The VA LCD includes two substrates spaced apart and facing each other, and a liquid crystal material layer interposed between the two substrates. Each of the two substrates includes a plurality of electrodes facing each other. A voltage applied across the electrodes induces an electric field in the liquid crystal material layer. An alignment of liquid crystal molecules within the liquid crystal material layer is changed in accordance with an intensity or direction of the induced electric field, thereby changing light transmissivity through the liquid crystal material layer. Thus, the VA LCD displays images by varying the induced electric field. However, since the VA LCD is driven by the induced electric field between the two substrates, the VA LCD has a narrow viewing-angle. An in-plane switching mode (IPS) LCD has been proposed to increase viewing-angle of the VA LCD.

Figure 1:
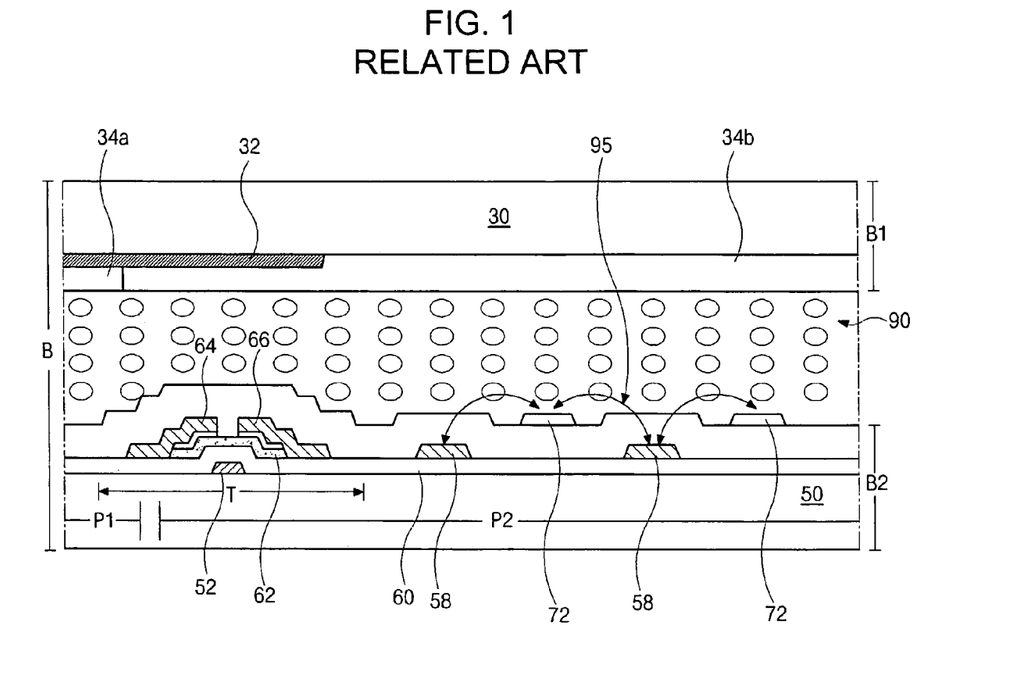
FIG. 1 is a cross-sectional view of the related art IPS LCD.

FIG. 1 is a cross-sectional view of a related art IPS LCD. Referring to FIG. 1, an IPS LCD B includes a color filter substrate B1, an array substrate B2, and a liquid crystal material layer 90 interposed between the color filter substrate B1 and the array substrate B2. A thin film transistor T, a common electrode 58 and a pixel electrode 72 are disposed in respective pixels P1 and P2 defined on a substrate 50 within the array substrate B2. The thin film transistor includes a gate electrode 52, semiconductor pattern 62 on a gate insulating layer 60, and source and drain electrodes 64 and 66 apart from each other. The common electrode 58 and the pixel electrode 72 are apart from and parallel to each other in the same substrate, i.e. the array substrate B2.

A black matrix 32 is disposed over the thin film transistor T on the color filter substrate B1. Respective color filters 34a and 34b are disposed over respective pixels P1 and P2. An alignment of liquid crystal molecules in the liquid crystal material layer 90 is changed by the in-plane electric field induced between the common electrode 58 and the pixel electrode 72.

Figure 2:
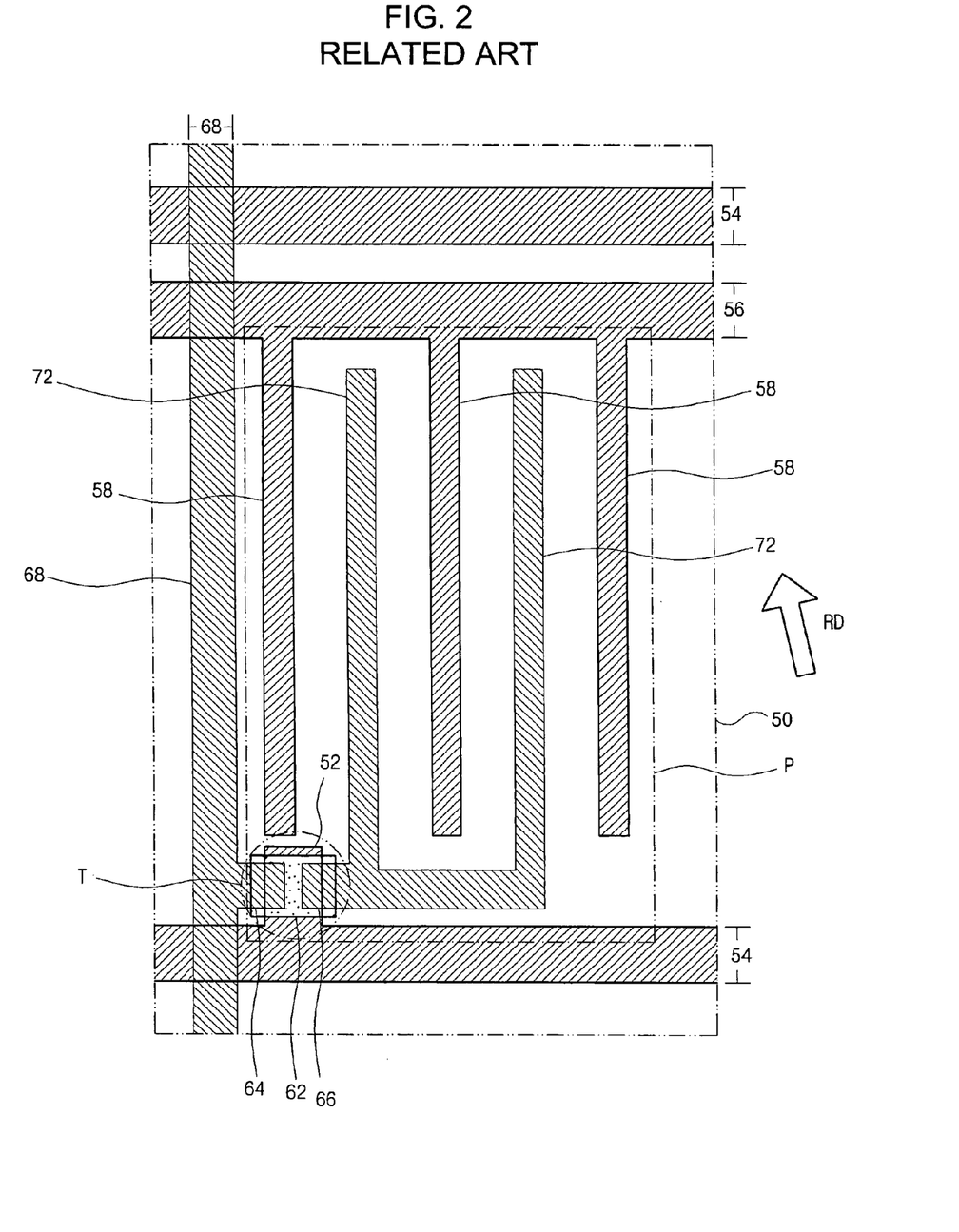
FIG. 2 is a plan view of an array substrate of an IPS LCD according to the related art.

FIG. 2 is a plan view of an array substrate of an IPS LCD according to the related art. Referring to FIG. 2, a plurality of gate lines 54 and at least one data line 68 are disposed on a substrate 50. Crossings of the gate lines and the at least one data line define a pixel region P. A thin film transistor T is disposed near each crossing of the gate lines 54 and the at least one data line 68. A common line 56 is apart from the gate line 54 and traverses the pixel region P. The thin film transistor T includes a gate electrode 52, a semiconductor pattern 62, and source and drain electrodes 64 and 66. The common electrode 58 and the pixel electrode 72 are apart from and parallel to each other. Liquid crystal molecules of the liquid crystal material layer 90 (shown in FIG. 1) are arranged along a rubbing direction RD of the alignment layer (not shown) in an initial stage.

Figure 3A:
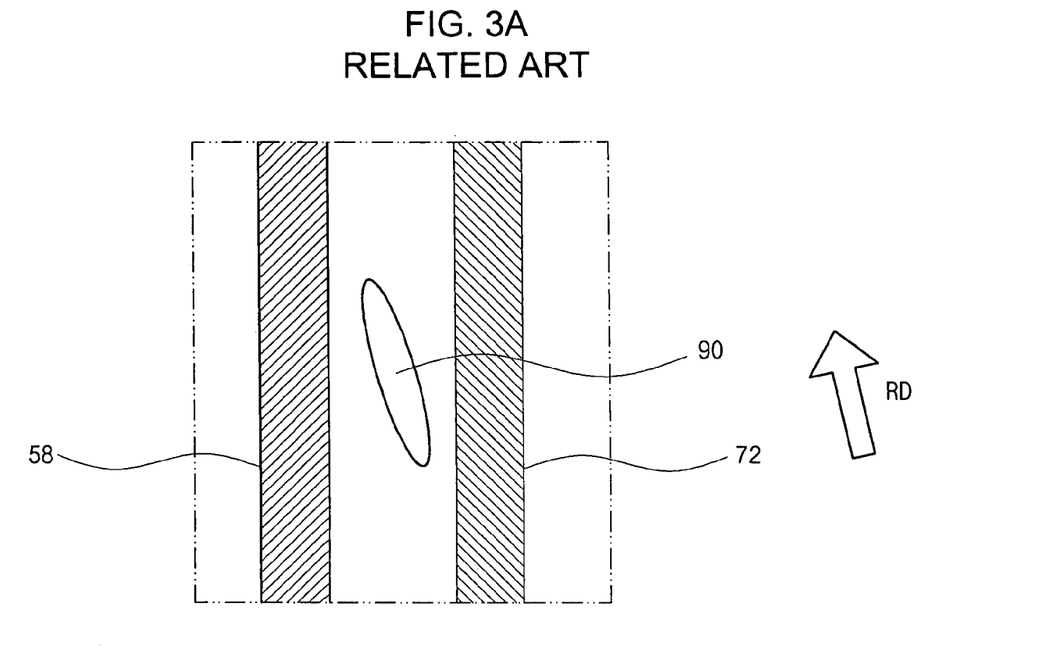
FIG. 3A is a plan view of an alignment of liquid crystal molecules in the IPS LCD of FIG. 2 when no in-plane electric field is induced.

FIG. 3A is a plan view of an alignment of liquid crystal molecules in the IPS LCD of FIG. 2 when no in-plane electric field is induced. Referring to FIG. 3A, no in-plane electric field is induced between the common electrode 58 and the pixel electrode 72. In this instance, a liquid crystal molecule 90 is arranged along a rubbing direction RD.

Figure 3B:
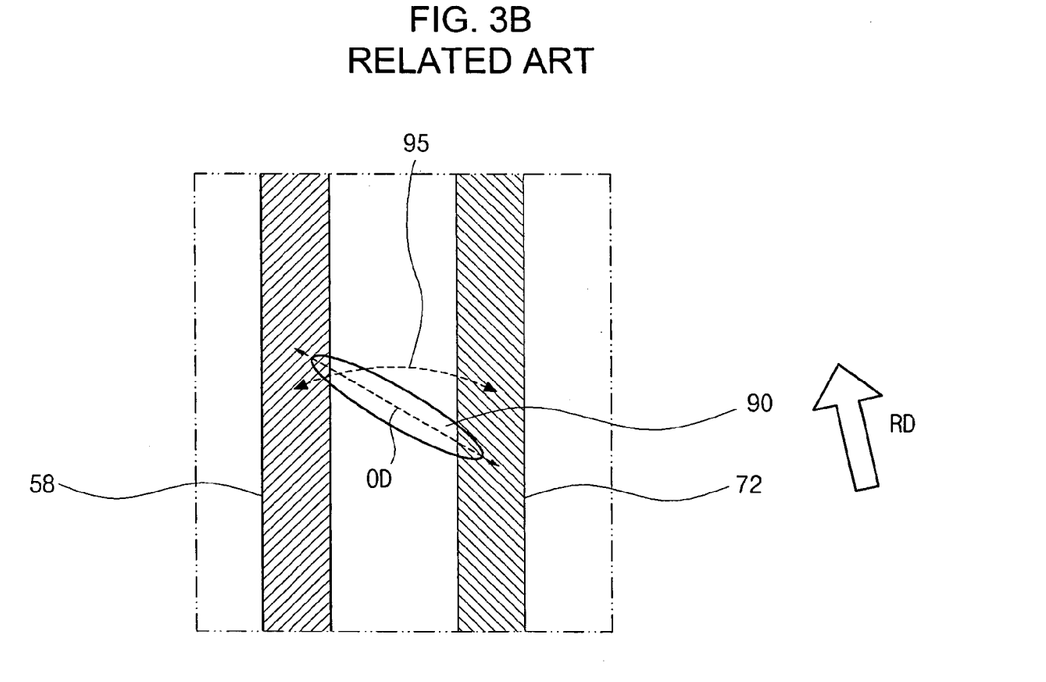
FIG. 3B is a plan view of an alignment of liquid crystal molecules in the IPS LCD of FIG. 2 when an in-plane electric field is induced.

FIG. 3B is a plan view of an alignment of liquid crystal molecules in the IPS LCD of FIG. 2 when an in-plane electric field is induced. Referring to FIG. 3B, an in-plane electric field 95 is induced between the common electrode 58 and the pixel electrode 72. In this instance, the liquid crystal molecule 90 is arranged along an specific direction OD between the rubbing direction RD and the induced in-plane electric field 95.

Light transmissivity is highest when an angle between the specific direction OD and the rubbing direction RD is 45 degrees. However, when the in-plane electric field 95 is stronger, the liquid crystal molecule 90 tends to be arranged near the in-plane electric field 95. Therefore, the angle between the specific direction OD and the rubbing direction RD is greater than 45 degrees, thereby significantly reducing light transmissivity.

SUMMARY OF THE INVENTION

Accordingly, the present invention is directed to an in-plane switching mode liquid crystal display and a fabricating method thereof that substantially obviate at least one of problems due to limitations and disadvantages of the related art.

An object of the present invention is to provide an in-plane switching mode liquid crystal display having a high light transmissivity.

Another object of the present invention is to provide a method of fabricating an in-plane switching mode liquid crystal display having a high light transmissivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display comprises a first substrate; a second substrate facing the first substrate; a liquid crystal material layer interposed between the first and second substrates; a data line and a gate line crossing each other on the first substrate, thus defining a pixel region; a thin film transistor disposed at a crossing of the gate line and the data line, the thin film transistor including a gate electrode, a semiconductor layer, a source electrode and a drain electrode; a pixel electrode connected with the thin film transistor and including at least one first pixel electrode portion and at least one second pixel electrode portion, a first angle between the at least one first pixel electrode portion and the at least one second pixel electrode portion being greater than 90 degrees; and a common electrode including at least one first common electrode portion and at least one second common electrode portion, a second angle between the at least one first common electrode portion and the at least one second common electrode portion is greater than 90 degrees, wherein the at least one first pixel electrode portion and the at least one second pixel electrode portion, and the at least one first common electrode portion and the at least one second common electrode portion define at least one domain.

In another aspect, the method of fabricating a liquid crystal display comprises defining a pixel region by forming a data line and a gate line crossing each other on a first substrate; forming a thin film transistor at a crossing of the gate line and the data line, the thin film transistor including a gate electrode, a semiconductor layer, a source electrode and a drain electrode; forming a pixel electrode connected with the thin film transistor and including at least one first pixel electrode portion and at least one second pixel electrode portion, a first angle between the at least one first pixel electrode portion and the at least one second pixel electrode portion being greater than 90 degrees; forming a common electrode including at least one first common electrode portion and at least one second common electrode portion, a second angle between the at least one first common electrode portion and the at least one second common electrode portion is greater than 90 degrees, wherein the at least one first pixel electrode portion and the at least one second pixel electrode portion, and the at least one first common electrode portion and the at least one second common electrode portion define at least one domain; and injecting a liquid crystal material between the first substrate and a second substrate facing each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 4:
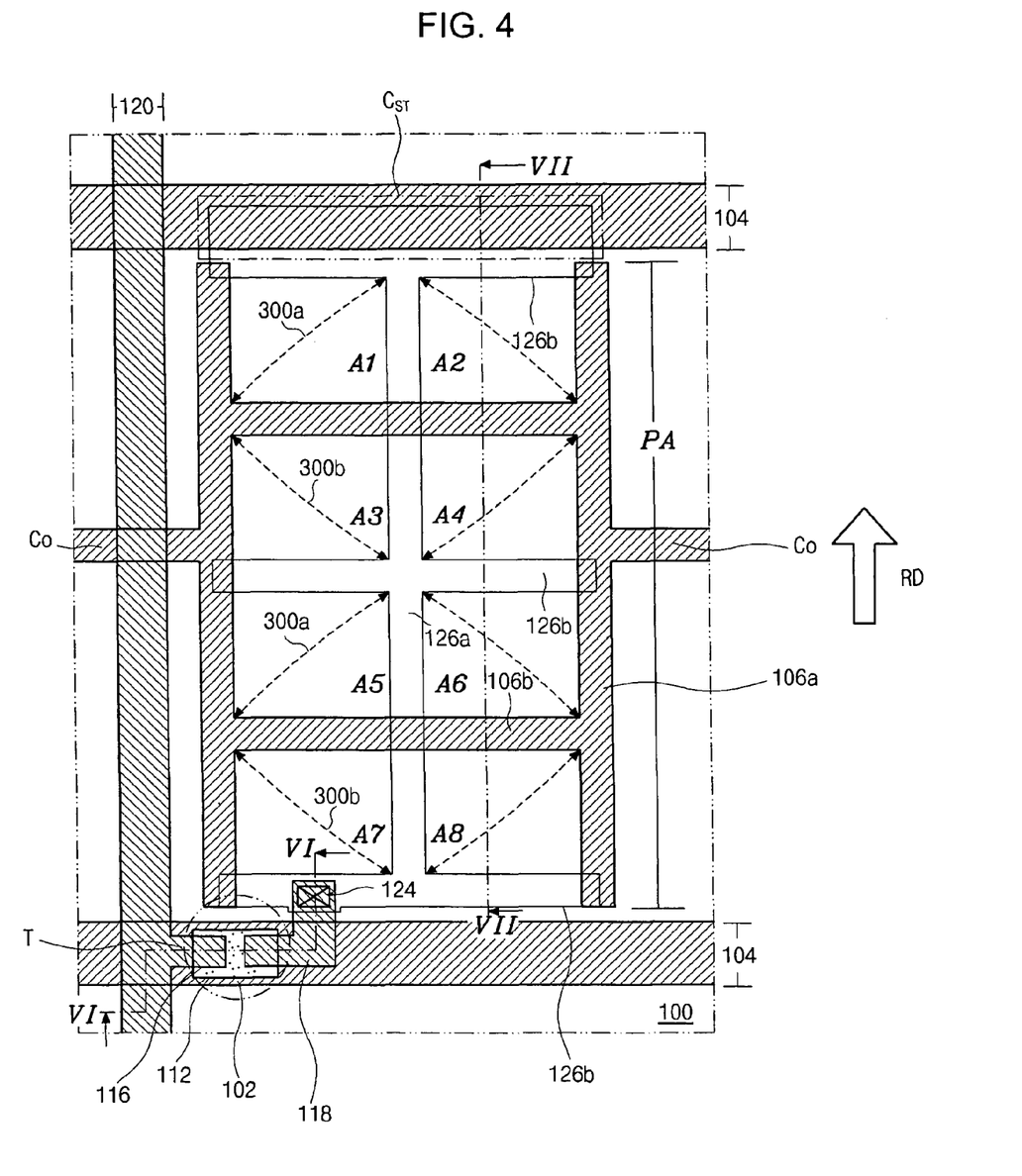
FIG. 4 is a plan view of an exemplary array substrate for an in-plane switching mode (IPS) liquid crystal display (LCD) according to a first embodiment of the present invention.

FIG. 4 is a plan view of an exemplary array substrate for an in-plane switching mode (IPS) liquid crystal display (LCD) according to a first embodiment of the present invention. Referring to FIG. 4, an array substrate includes a plurality of gate lines 104 and at least one data line 120 disposed on a substrate 100 and crossing each other to define a pixel region PA. For example, the plurality of gate lines 104 may be disposed in a latitudinal direction of the substrate 100, and the at least one data line 120 may be disposed in a longitudinal direction of the substrate 100. A color filter substrate (not shown) may face the array substrate. A liquid crystal material layer (not shown) is interposed between the array substrate and the color filter substrate. Liquid crystal molecules of the liquid crystal material layer are arranged along a rubbing direction RD of the rubbing layer (not shown) in an initial stage.

A thin film transistor T is disposed near a crossing of the plurality of gate lines 104 and the at least one data line 120. The thin film transistor T includes a gate electrode 102. A semiconductor pattern 112 of the thin film transistor T is formed over the gate electrode 102. Source and drain electrodes 116 and 118 of the thin film transistor T are formed apart from each other.

A common electrode 106 and a pixel electrode 126 are disposed in the pixel region PA on the same substrate 100. The pixel electrode 126 is connected to the drain electrode 118. Common electrodes 106 in adjacent pixel regions PA along the gate line 104 are connected through a connection line Co. The common electrode 106 and the pixel electrode 126 induce first and second in-plane electric fields 300a and 300b in the pixel region PA between the common electrode 106 and the pixel electrode 126.

The pixel electrode 126 includes a first pixel electrode portion 126a, which may be a longitudinal portion 126a, and a plurality of second pixel electrode portions 126b, which may be latitudinal portions 126b. The first pixel electrode portion 126a is perpendicular to the plurality of second pixel electrode portions 126b. One of the second pixel electrode portions 126b is adjacent to a gate line 104 and is connected to the drain electrode 118 of the thin film transistor T. Another second pixel electrode portion 126b overlaps a previous gate line 104 and defines a storage capacitor $C_{ST}$ with the previous gate line 104.

The common electrode 106 includes a plurality of first common electrode portions 106a, which may be longitudinal common electrode portions 106a, and second common electrode portions 106b, which may be latitudinal common electrode portions 106b. The first common electrode portions 106a are perpendicular to the second common electrode portion 106b, are apart from and parallel to the first pixel electrode portion 126a, and are perpendicular to the second pixel electrode portion 126b. The first common electrode portions 106a in adjacent pixel regions PA along the gate line 104 and adjacent to the data line 120 are connected through the connection line Co. The second common electrode portions 106b are apart from and parallel to the second pixel electrode portions 126b, and are perpendicular to the first pixel electrode portion 126a.

Crossings of the common electrode 106 and the pixel electrode 126 define a plurality of domains A1 to A8. Specifically, in one embodiment of the present invention, the second pixel electrode portions 126b alternate with the second common electrode portions 106b in the first direction to form rectangular regions between the first common electrode portions 106a. The first pixel electrode portion 126a positioned between the first common electrode portions 106a divides the rectangular regions into rectangular domains A1 and A2, A3 and A4, A5 and A6, and A7 and A8, respectively.

The first and second pixel electrode portions 126a and 126b are symmetrical with respect to each other, and the first and second common electrode portions 106a and 106b are symmetrical with respect to each other. The first in-plane electric field 300a is induced within a first plurality of the rectangular domains. The second in-plane electric field 300b is induced within a second plurality of the rectangular domains. The first plurality and the second plurality of domains are alternatively disposed along the gate line 104 and the data line 120, and are symmetrical with respect to the first and second pixel electrode portions 126a and 126b, and with respect to the first and second common electrode portions 106a and 106b. As depicted in FIG. 4, the first in-plane electric field 300a is induced within the first, fourth, fifth and eight domains A1, A4, A5 and A8. The second in-plane electric field 300b is induced within the second, third, sixth and seventh domains A2, A3, A6 and A7.

Figure 5A:
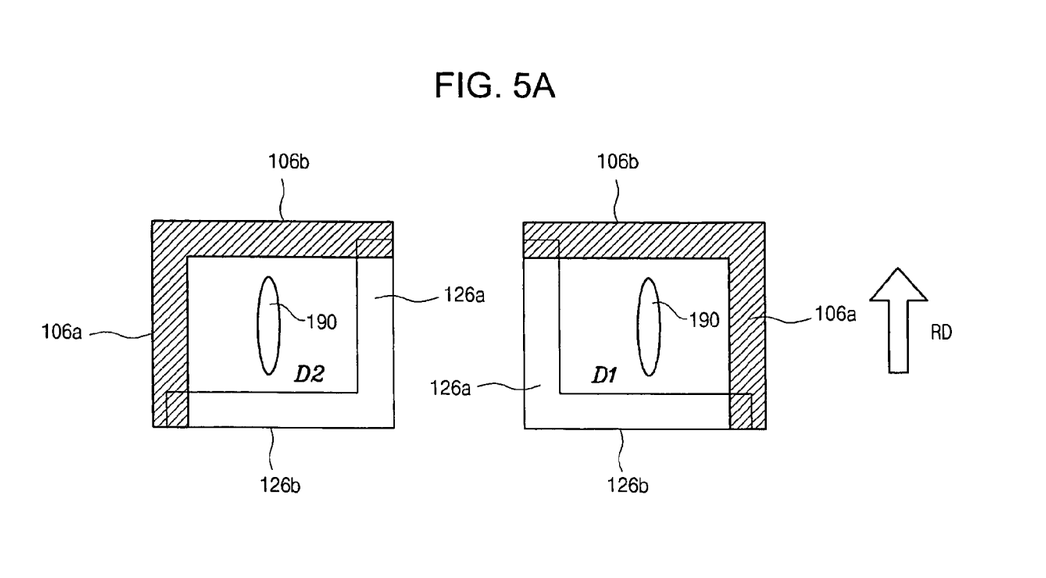
FIG. 5A is a plan view of an exemplary alignment of liquid crystal molecules in the IPS LCD of FIG. 4 when no first and second in-plane electric fields are applied.
Figure 5B:
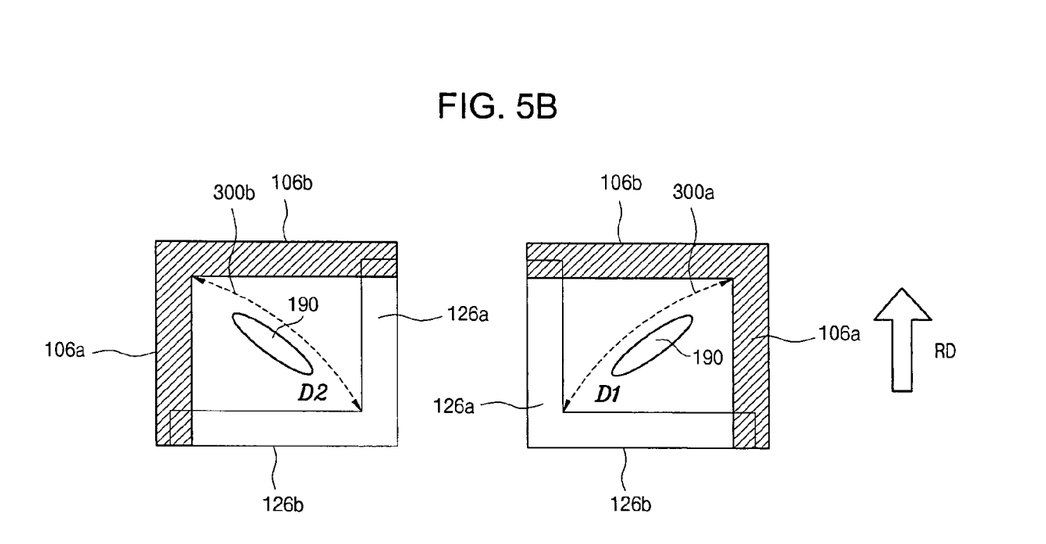
FIG. 5B is a plan view of exemplary alignments of liquid crystal molecules in the IPS LCD of FIG. 4 when first and second in-plane electric fields are applied.

FIG. 5A is a plan view of an exemplary alignment of liquid crystal molecules in the IPS LCD of FIG. 4 when no first and second in-plane electric fields are applied. FIG. 5B is a plan view of exemplary alignments of liquid crystal molecules in the IPS LCD of FIG. 4 when first and second in-plane electric fields are applied. Referring to FIG. 5A and 5B, a right domain D1 represents one of the first, fourth, fifth and eight domains A1, A4, A5 and A8, which induce the first in-plane electric field 300a shown in FIG. 4. A left domain D2 represents one of the second, third, sixth and seventh domains A2, A3, A6 and A7, which induce the second in-plane electric field 300b shown in FIG. 4. In addition, the right and left domains D1 and D2 may be square or rectangular.

Referring to FIG. 5A, when no electric field is applied between the common electrode 106 and the pixel electrode 126, liquid crystal molecules 190 in the right and left domains D1 and D2 are arranged along a rubbing direction RD. In contrast, in FIG. 5B, when the first and second in-plane electric fields 300a and 300b are induced between the common electrode 106 and the pixel electrode 126, the liquid crystal molecules 190 in the right and left domains D1 and D2 are arranged in accordance with the in-plane electric field 300a and 300b, respectively. If the right and left domains D1 and D2 are both square, the first and second in-plane electric fields 300a and 300b are inclined by an angle of about 45 degrees with respect to the rubbing direction RD. Accordingly, even when the first and second in-plane electric fields 300a and 300b are stronger, the liquid crystal molecules 190 tend to be arranged close to the in-plane electric field 300a and 300b, for example by an angle of about 45 degrees with respect to the rubbing direction RD.

According to the first embodiment of the present invention, the liquid crystal molecule 190 can be oriented according to an angle of about 45 degrees with respect to the rubbing direction RD, thereby maximizing light transmissivity. In addition, since the first and second in-plane electric fields 300a and 300b are symmetrical to each other, the domains A1 to A8 in FIG. 4 having the first and second in-plane electric fields 300a and 300b, respectively, can compensate display characteristics, thereby increasing the viewing-angle.

Figure 6A:
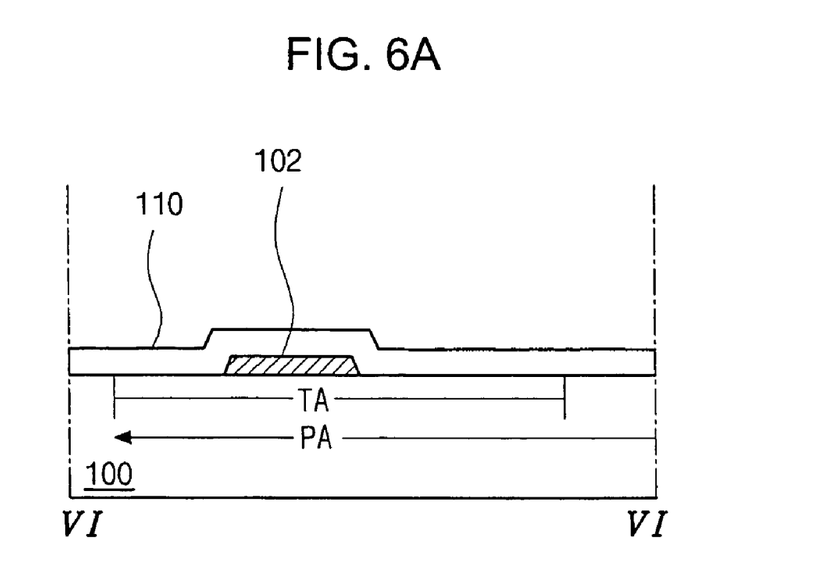
FIG. 6A is a cross-sectional view taken along the line VI-VI in FIG. 4 showing formation of a first metal patterned layer and a gate insulation layer on a substrate in an exemplary fabricating method of an array for an IPS LCD according to the first embodiment of the present invention.
Figure 7A:
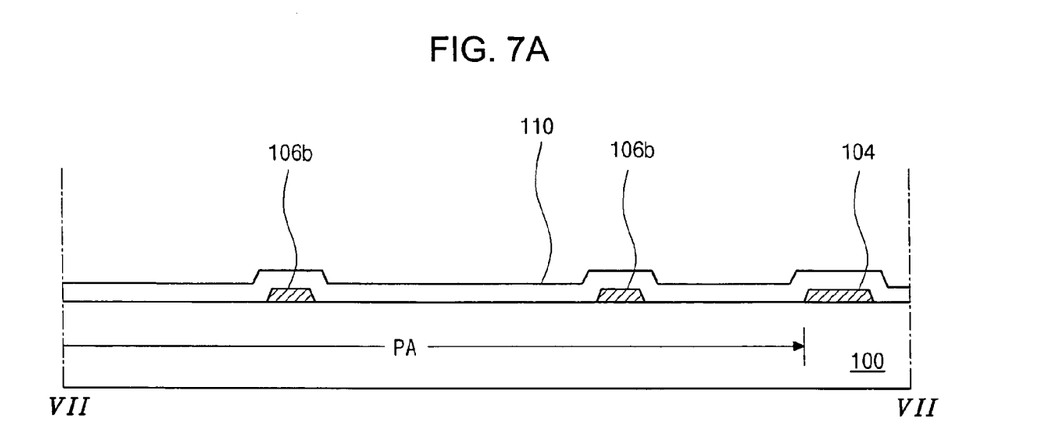
FIG. 7A is a cross-sectional view taken along the line VII-VII in FIG. 4 after formation of the first metal patterned layer and the gate insulation layer of FIG. 6A.

FIG. 6A is a cross-sectional view taken along the line VI-VI in FIG. 4 showing formation of a first metal patterned layer and a gate insulation layer on a substrate in an exemplary fabricating method of an array for an IPS LCD according to the first embodiment of the present invention. FIG. 7A is a cross-sectional view taken along the line VII-VII in FIG. 4 after formation of the first metal patterned layer and the gate insulation layer of FIG. 6A. Referring to FIGS. 6A and 7A, a first metal (not shown) is deposited on a substrate 100 where a switching region TA and a pixel region PA are defined. For example, the first metal may be one of Al (aluminum), Cr (chromium), Mo (molybdenum), W (tungsten), Ti (titanium) and Cu (copper). The first metal is patterned to form a gate line 104, a gate electrode 102, a common electrode including a plurality of first and second common electrode portions 106a (shown in FIG. 4) and 106b, and a connection line Co. A gate insulating layer 110 is formed on the substrate 100 including the gate line 104.

Figure 6B:
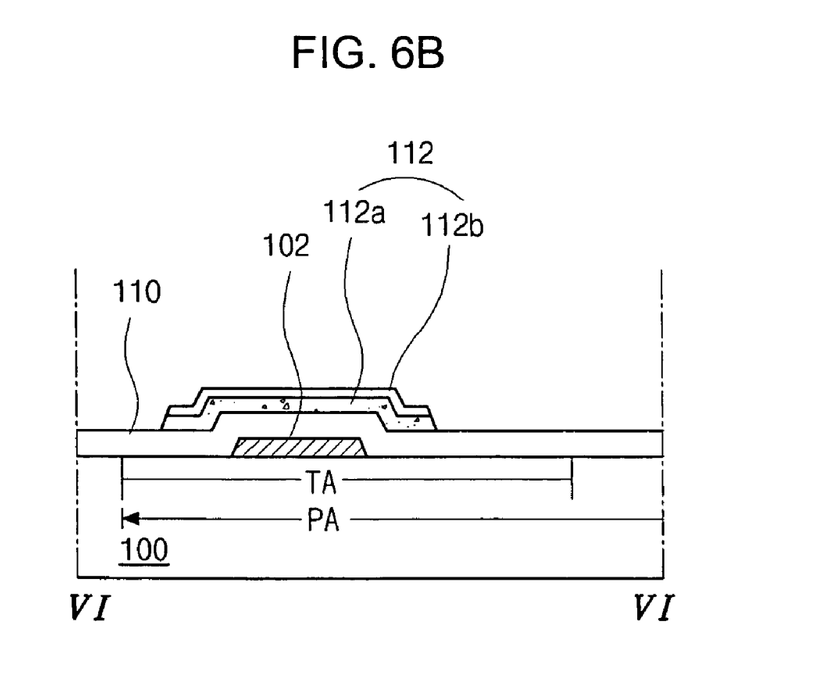
FIG. 6B is a cross-sectional view taken along the line VI-VI in FIG. 4 showing formation of a semiconductor pattern on a substrate in an exemplary fabricating method of an array for an IPS LCD according to the first embodiment of the present invention.
Figure 7B:
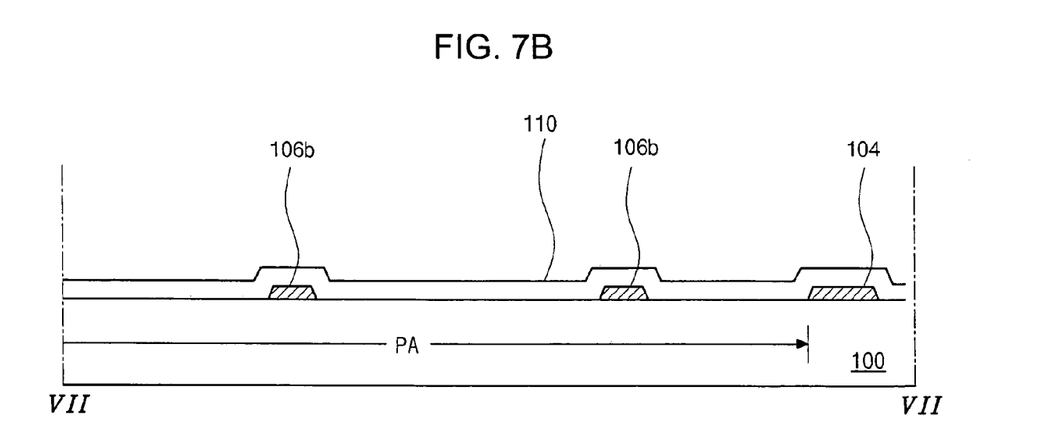
FIG. 7B is a cross-sectional view taken along the line VII-VII in FIG. 4 after formation of the semiconductor pattern of FIG. 6B.

FIG. 6B is a cross-sectional view taken along the line VI-VI in FIG. 4 showing formation of a semiconductor pattern on a substrate in an exemplary fabricating method of an array for an IPS LCD according to the first embodiment of the present invention. FIG. 7B is a cross-sectional view taken along the line VII-VII in FIG. 4 after formation of the semiconductor pattern of FIG. 6B. An intrinsic amorphous silicon (a–Si) and an impurity doped amorphous silicon (n+a–Si) may be deposited on the gate insulating layer 110 and patterned to form a semiconductor pattern 112. The semiconductor pattern 112 includes a lower layer 112a, which is an active layer 112a of the intrinsic amorphous silicon, and an upper layer 112b, which is an ohmic contact layer 112b of the impurity doped amorphous silicon.

Figure 6C:
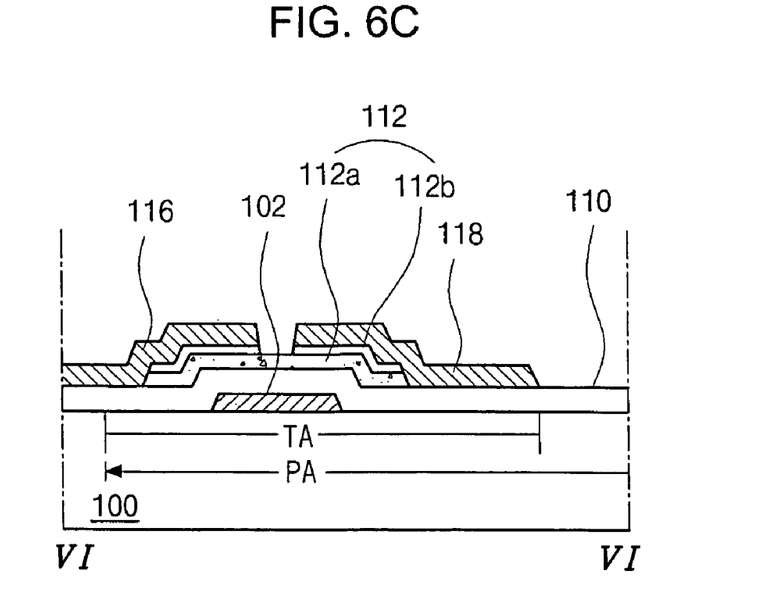
FIG. 6C is a cross-sectional view taken along the line VI-VI in FIG. 4 showing formation of a second metal patterned layer on a substrate in an exemplary fabricating method of an array for an IPS LCD according to the first embodiment of the present invention.
Figure 7C:
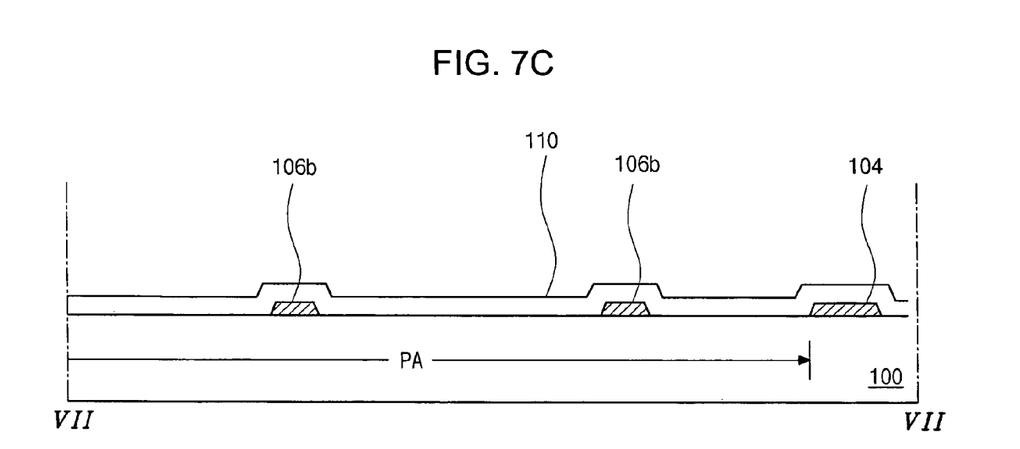
FIG. 7C is a cross-sectional view taken along the line VII-VII in FIG. 4 after formation of the second metal patterned layer of FIG. 6C.

FIG. 6C is a cross-sectional view taken along the line VI-VI in FIG. 4 showing formation of a second metal patterned layer on a substrate in an exemplary fabricating method of an array for an IPS LCD according to the first embodiment of the present invention. FIG. 7C is a cross-sectional view taken along the line VII-VII in FIG. 4 after formation of the second metal patterned layer of FIG. 6C. Referring to FIGS. 6C and 7C, a second metal (not shown) is deposited on the substrate 100 including the semiconductor pattern 112. The second metal layer is patterned to form a data line 120 (shown in FIG. 4), and source and drain electrodes 116 and 118 apart from each other. Furthermore, a portion of the ohmic contact layer 112b exposed through the source and drain electrodes 116 and 118 is removed by an etching process. For example, the second metal may include one of Al (aluminum), Cr (chromium), Mo (molybdenum), W (tungsten), Ti (titanium) and Cu (copper).

Figure 6D:
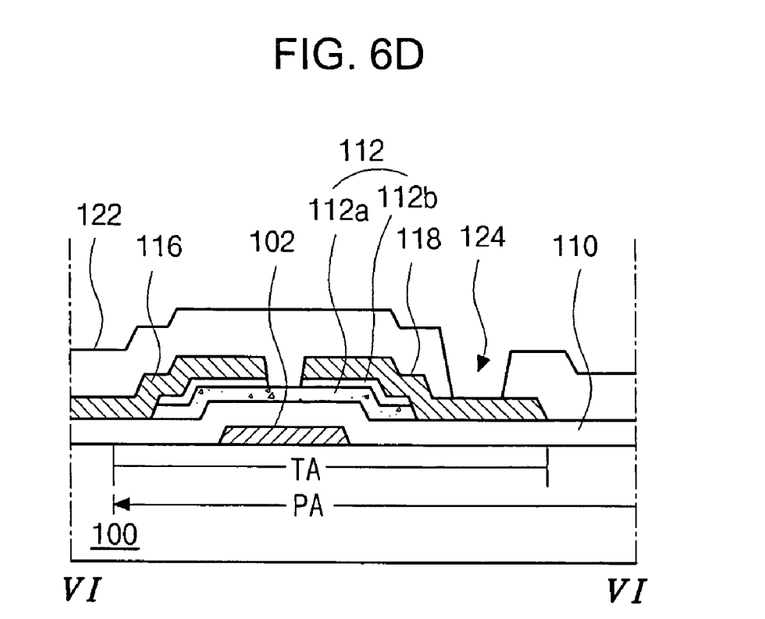
FIG. 6D is a cross-sectional view taken along the line VI-VI in FIG. 4 showing formation of a passivation layer on a substrate in an exemplary fabricating method of an array for an IPS LCD according to the first embodiment of the present invention.
Figure 7D:
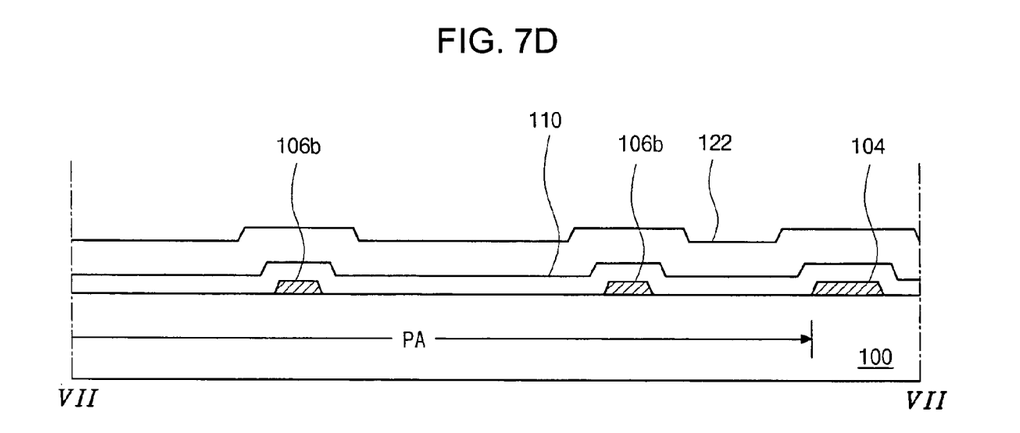
FIG. 7D is a cross-sectional view taken along the line VII-VII in FIG. 4 after formation of the passivation layer of FIG. 6D.

FIG. 6D is a cross-sectional view taken along the line VI-VI in FIG. 4 showing formation of a passivation layer on a substrate in an exemplary fabricating method of an array for an IPS LCD according to the first embodiment of the present invention. FIG. 7D is a cross-sectional view taken along the line VII-VII in FIG. 4 after formation of the passivation layer of FIG. 6D. Referring to FIGS. 6D and 7D, an insulating material 122 is deposited on the substrate 100 including the source and drain electrodes 116 and 118. The insulating material is patterned to form a passivation layer 122. A drain contact hole 124 is provided through the passivation layer 122 to expose the drain electrode 118. The insulating material may include BCB (benzo-cyclo-butene) or acrylic resin.

Figure 6E:
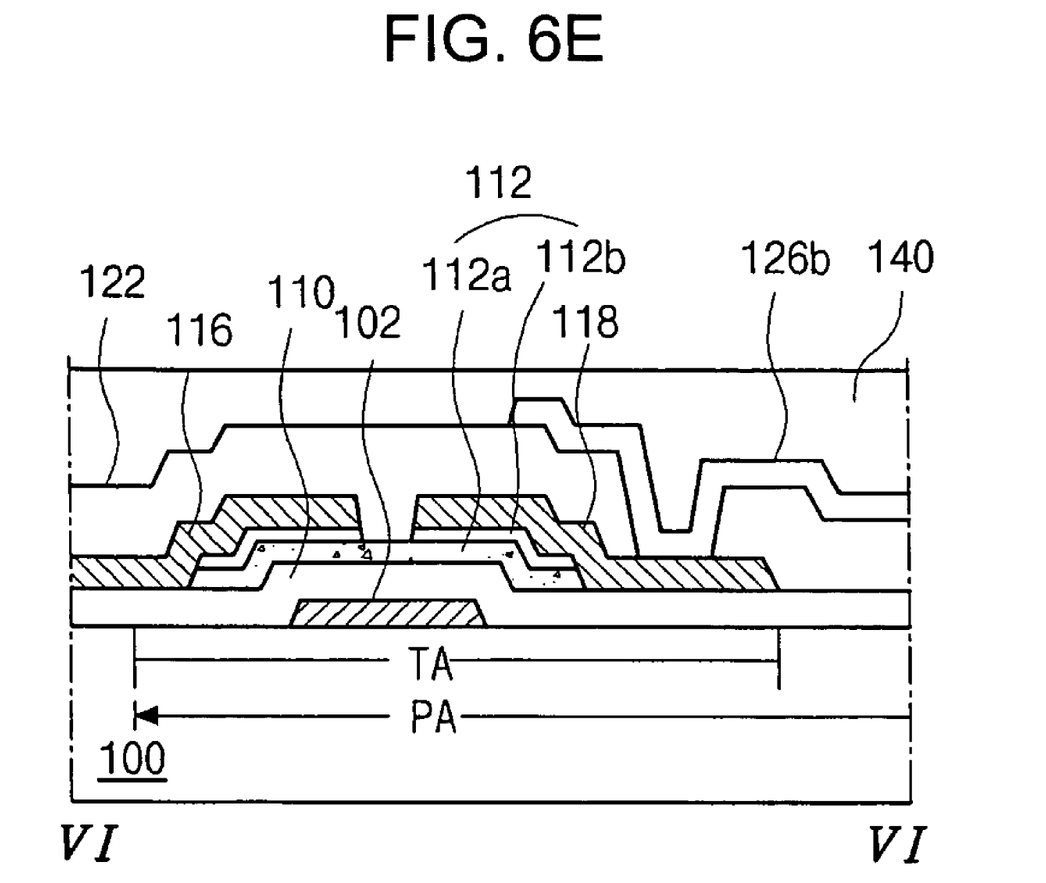
FIG. 6E is a cross-sectional view taken along the line VI-VI in FIG. 4 showing formation of a pixel electrode patterned layer and an alignment layer on a substrate in an exemplary fabricating method of an array for an IPS LCD according to the first embodiment of the present invention.
Figure 7E:
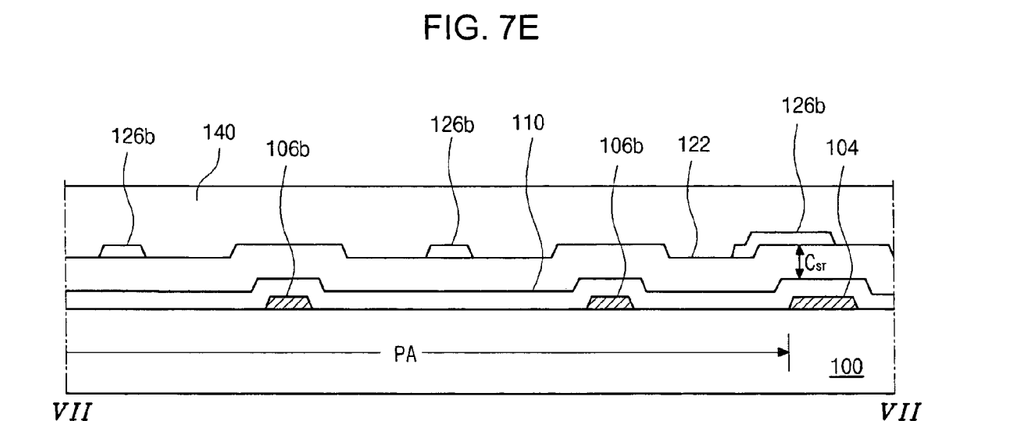
FIG. 7E is a cross-sectional view taken along the line VII-VII in FIG. 4 after formation of the pixel electrode patterned layer and the alignment layer of FIG. 6E.

FIG. 6E is a cross-sectional view taken along the line VI-VI in FIG. 4 showing formation of a pixel electrode patterned layer and an alignment layer on a substrate in an exemplary fabricating method of an array for an IPS LCD according to the first embodiment of the present invention. FIG. 7E is a cross-sectional view taken along the line VII-VII in FIG. 4 after formation of the pixel electrode patterned layer and the alignment layer of FIG. 6E. Referring to FIGS. 6E and 7E, a transparent conductive material (not shown) is deposited on the passivation layer 122. The transparent conductive material is patterned to form a pixel electrode including a plurality of first and second pixel electrode portions 126a (shown in FIG. 4) and 126b. The transparent conductive material may include ITO (indium-tin-oxide) and IZO (indium-zinc-oxide).

An alignment layer 140 is formed on the substrate 100 including the pixel electrode 126. The alignment layer 140 is rubbed along the rubbing direction RD (shown in FIG. 4).

In accordance with the first embodiment of the present invention, the array substrate and a color filter substrate may be joined. A liquid crystal material may be injected between the array substrate and the color filter layer, thereby forming the IPS LCD. The color filter substrate may have the same alignment layer as the array substrate shown in FIGS. 6E and 7E.

In accordance with the first embodiment of the present invention, liquid crystal molecules adjacent to the alignment layer are difficult to align with the in-plane electric field because an anchoring energy due to the alignment layer tends to align the liquid crystal molecules along the rubbing direction. In addition, liquid crystal molecules adjacent to corners of the pixel electrode and the common electrode of each domains are difficult to align with the in-plane electric field because the in-plane electric field adjacent to corners of the pixel electrode and the common electrode of each domains is induced along corners of the pixel electrode and the common electrode, rather than diagonally. Accordingly, light transmissivity can be reduced in the first embodiment of the present invention.

Figure 8:
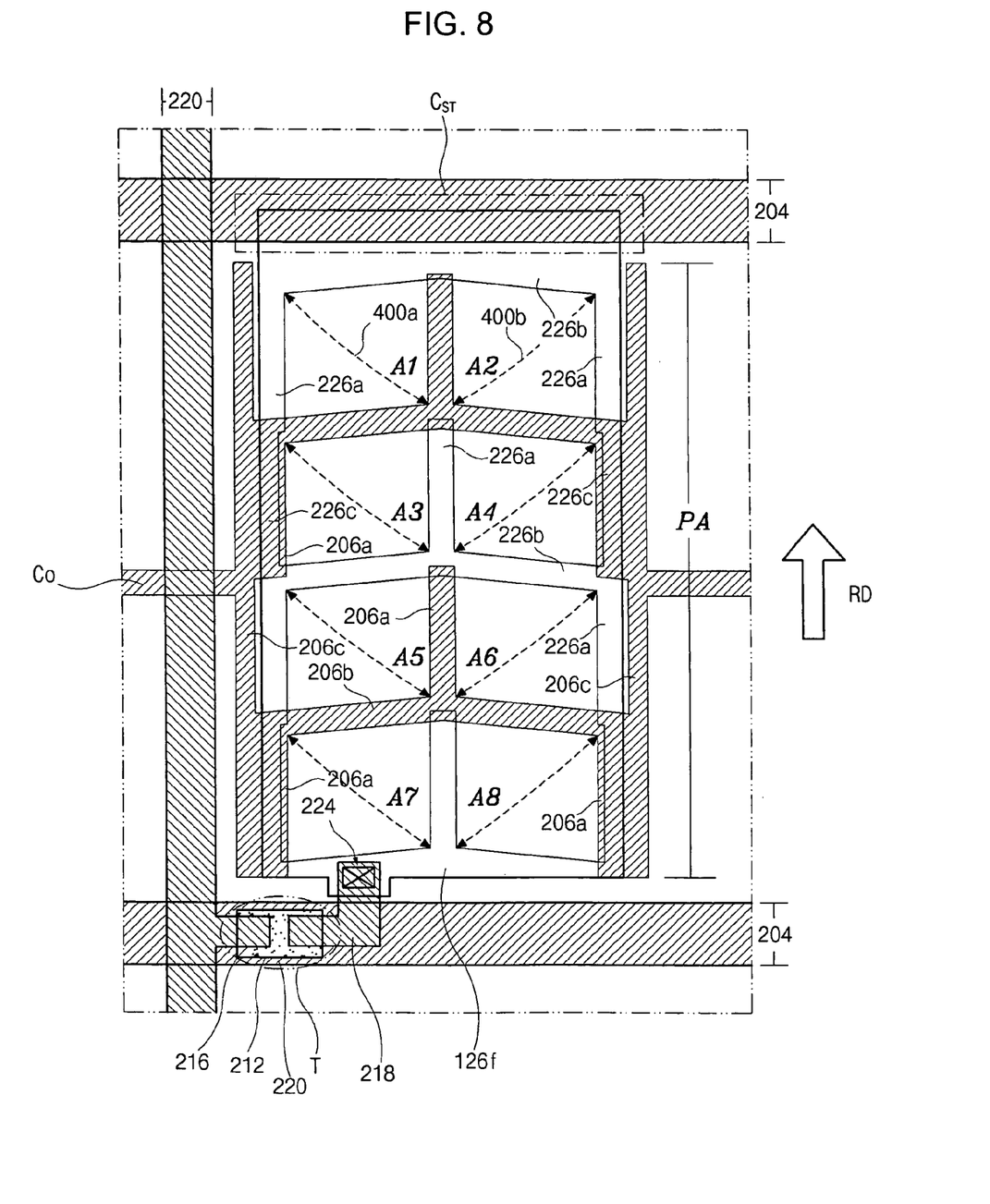
FIG. 8 is a plan view of an exemplary array substrate for an in-plane switching mode (IPS) liquid crystal display (LCD) according to a second embodiment of the present invention.

FIG. 8 is a plan view of an exemplary array substrate for an in-plane switching mode (IPS) liquid crystal display (LCD) according to a second embodiment of the present invention. Explanations relating to similar portions of the IPS LCD described in FIGS. 4 and 8 are omitted hereinafter. Referring to FIG. 8, an array substrate includes at least one pixel electrode 226 and at least one common electrode 206.

A pixel electrode 226 includes a plurality of first pixel electrode portions 226a, a plurality of second pixel electrode portions 226b, and a plurality of third pixel electrode portions 226c. Each of the plurality of first pixel electrode portions 226a extends along a rubbing direction RD. An angle between a first pixel electrode portion 226a and a second pixel electrode portion 226b is greater than a right angle (90 degrees). Each of the first pixel electrode portions 226a is connected to a contact area of adjacent second pixel electrode portions 226b.

The adjacent second pixel electrode portions 226b are substantially symmetrical with respect to the first pixel electrode portion 226a. An angle between the second pixel electrode portion 226b and the third pixel electrode portion 226c is less than 90 degrees. The second pixel electrode portion 226b may be longer than the first pixel electrode portion 226a.

The third pixel electrode portions 226c extend along the first pixel electrode portions 226b. Each of the third pixel electrode portions 226c connects the first pixel electrode portion 226a with the second pixel electrode portion 226b. The third pixel electrode portions 226c may be disposed at both sides of the pixel region PA. The third pixel electrode portion 226c may be narrower than the first pixel electrode portion 226b.

A common electrode 206 includes a plurality of first common electrode portions 206a, a plurality of second common electrode portions 206b, and a plurality of third common electrode portions 206c. The first common electrode portions 206a extend along a rubbing direction RD. An angle between the first common electrode portion 206a and the second common electrode portion 206b is greater than 90 degrees. Each of the first common electrode portions 206a is connected to a contact area of adjacent second common electrode portions 206b.

The adjacent second common electrode portions 206b are substantially symmetrical with respect to the first common electrode portion 206a. An angle between the second common electrode portion 206a and the third common electrode portions 206 is less than or greater than 90 degrees. The second common electrode portion 206b may be longer than the first common electrode portion 206a.

The third common electrode portions 206c extend along the first common electrode portions 226b, and connect the first common electrode portions 206a and the second common electrode portions 206b. The third common electrode portions 206c in adjacent pixel regions PA along the gate line 204 and adjacent to the data line 220 are connected through a connection line Co. The first common electrode portions 206b at both outer sides of the pixel region PA cover the third pixel electrode portions 226c. The third common electrode portions 206c may be disposed at both outer sides of the pixel electrode 226.

The first and second pixel electrode portions 226a and 226b may be substantially parallel to and have substantially the same length as the first and second common electrode portions 206a and 206b, respectively. An angle between the first and second pixel electrode portions 226a and 226b may be equal to the angle between the first and second common electrode portions 226a and 226b. The first and second pixel electrode portions 226a and 226b, and corresponding first and second common electrode portions 206a and 206b, respectively, may define domains A1 to A8, each of which may be a parallelogram.

A first in-plane electric field 400a is induced in a first plurality of the domains, A1, A3, A5 and A7. A second in-plane electric field 400b is induced in a second plurality of the domains A2, A4, A6 and A8. Adjacent second pixel electrode portions 226b are symmetrical with respect to one of the first pixel electrode portions 226a, and adjacent second common electrode portions 206b are symmetrical with respect to one of the first common electrode portions 206a.

The domains corresponding to the first in-plane electric field 400a and the domains corresponding to the second in-plane electric field 400b are alternatively disposed along the gate line 204 and are substantially symmetrical with respect to the first pixel electrode portion 226a and the first common electrode portion 206a. Thus, the plurality of domains A1 to A8 are divided into the first, third, fifth and seventh domains A1, A3, A5 and A7 corresponding to the first in-plane electric field 400a, and the second, fourth, sixth and eighth domains A2, A4, A6 and A8 corresponding to the second in-plane electric field 400b.

The first and second electric fields 400a and 400b induced in the domains A1 to A8 have an angle greater than 45 degrees with respect to the rubbing direction RD because the angle between the first and second pixel electrode portions 226a and 226b is greater than 90 degrees, the angle between the first and second common electrode portions 206a and 206b is greater than 90 degrees, the first pixel electrode portion 226a is longer than the second pixel electrode portion 226b, and the first common electrode portion 206a is longer than the second pixel electrode portion 206b. Accordingly, liquid crystal molecules adjacent to the alignment layer can overcome anchoring energy to align themselves in a direction of about 45 degrees with respect to the rubbing direction RD.

The angle between the first and second pixel electrode portions 226a and 226b is greater than 90 degrees. The angle between the first and second common electrode portions 206a and 206b is also greater than 90 degrees. The pixel electrode 226 is closer to the common electrode 206 in each domain A1 to A8. The first and second in-plane electric fields 400a and 400b adjacent to corners of the pixel electrode 226 and the common electrode 206 of each domain A1 to A8 can be efficiently diagonally-induced. Thus, an alignment of liquid crystal molecules adjacent to corners of the pixel electrode 226 and the common electrode 206 in each domain A1 to A8 is about 45 degrees with respect to the rubbing direction RD, thereby improving light transmissivity.

It will be apparent to those skilled in the art that various modifications and variations can be made in the in-plane switching mode liquid crystal display of the present invention and the fabricating method thereof without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a second substrate facing the first substrate;
a liquid crystal material layer interposed between the first and second substrates;
a data line and a gate line crossing each other on the first substrate, thus defining a pixel region;
a thin film transistor disposed at a crossing of the gate line and the data line, the thin film transistor including a gate electrode, a semiconductor layer, a source electrode and a drain electrode;
a pixel electrode connected with the thin film transistor and including a plurality of first pixel electrode portions, a plurality of second pixel electrode portions and a plurality of third pixel electrode portions disposed at both sides of the pixel region, a first angle between one of the plurality of first pixel electrode portions and one of the plurality of second pixel electrode portions being greater than 90 degrees, wherein one of the plurality of third pixel electrode portions connects one of the plurality of first pixel electrode portions with one of the plurality of second pixel electrode portions; and
a common electrode including a plurality of first common electrode portions and a plurality of second common electrode portions, a second angle between one of the plurality of first common electrode portions and one of the plurality of second common electrode portions-is greater than 90 degrees, wherein one of the plurality of first pixel electrode portions and one of the plurality of second pixel electrode portions, one of the plurality of first common electrode portions and one of the plurality of second common electrode portions define at least one domain,
wherein the plurality of first common electrode portions are parallel to the plurality of third pixel electrode portions and one of the plurality of first common electrode portions overlaps one of the plurality of third pixel electrode portions,
wherein the plurality of first common electrode portions, the plurality of first pixel electrode portions and the plurality of third pixel electrode portions are parallel to the data line,
wherein the common electrode includes a plurality of third common electrode portions disposed at both outer sides of the pixel electrode, wherein one of the plurality of third common electrode portions connects one of the plurality of first common electrode portions and one of the plurality of second common electrode portions, wherein one of the plurality of first pixel electrode portions is parallel to and spaced apart from one of the plurality of third common electrode portions, and wherein one of the plurality of third pixel electrode portions is parallel to and overlaps one of the plurality of first common electrode portions,
wherein the plurality of third pixel electrode portions are narrower than the plurality of first pixel electrode portions.

2. The liquid crystal display according to claim 1, wherein one of the plurality of first pixel electrode portions is connected to adjacent second pixel electrode portions.

3. The liquid crystal display according to claim 2, wherein the adjacent second pixel electrode portions are substantially symmetrical with respect to one of the plurality of first pixel electrode portions.

4. The liquid crystal display according to claim 1, wherein one of the plurality of first common electrode portions is connected to adjacent second common electrode portions.

5. The liquid crystal display according to claim 4, wherein the adjacent second common electrode portions are substantially symmetrical with respect to one of the plurality of first common electrode portions.

6. The liquid crystal display according to claim 1, wherein the plurality of first pixel electrode portions and the plurality of second pixel electrode portions are substantially parallel to the plurality of first common electrode portions and the plurality of second common electrode portions, respectively.

7. The liquid crystal display according to claim 1, wherein the first angle is substantially equal to the second angle.

8. The liquid crystal display according to claim 1, further comprising a connection line connecting a common electrode in a pixel region with an adjacent common electrode in an adjacent pixel region along the gate line.

9. The liquid crystal display according to claim 1, further comprising an alignment layer rubbed along the plurality of first pixel electrode portions.

10. The liquid crystal display according to claim 9, wherein the alignment layer includes first and second alignment layers disposed on the first and second substrates, respectively.

11. The liquid crystal display according to claim 1, wherein the at least one domain has substantially a parallelogram shape.

12. The liquid crystal display according to claim 1, wherein the at least one domain includes first and second domains within which first and second in-plane electric fields are induced, respectively.

13. The liquid crystal display according to claim 12, wherein the first and second domains are symmetrical with respect to one of the plurality of first pixel electrode portions.

14. The liquid crystal display according to claim 12, wherein an angle between one of the plurality of first pixel electrode portions and one of the first and second electric fields is greater than 45 degrees.

15. The liquid crystal display according to claim 1, wherein the common electrode and the gate line are disposed at the same layer.

16. The liquid crystal display according to claim 1, wherein the pixel electrode is made of a transparent conductive material including one of indium-tin-oxide (ITO) and indium-zinc-oxide (IZO).

* * * * *